US012748382B2

(12) United States Patent
Fujisawa

(10) Patent No.: US 12,748,382 B2
(45) Date of Patent: Sep. 29, 2026

(54) MECHANICAL WATCH

(71) Applicant: SEIKO EPSON CORPORATION, Tokyo (JP)

(72) Inventor: Teruhiko Fujisawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 226 days.

(21) Appl. No.: 18/436,138

(22) Filed: Feb. 8, 2024

(65) Prior Publication Data

US 2024/0272588 A1 Aug. 15, 2024

(30) Foreign Application Priority Data

Feb. 9, 2023 (JP) ................................ 2023-018195

(51) Int. Cl.
*G04C 3/06* (2006.01)
*G04C 10/02* (2006.01)

(52) U.S. Cl.
CPC ............ *G04C 3/064* (2013.01); *G04C 10/02* (2013.01)

(58) Field of Classification Search
None
See application file for complete search history.

(56) References Cited

U.S. PATENT DOCUMENTS 6,973,010 B1 * 12/2005 Koike .................... G04C 10/00 368/204
7,016,265 B2 * 3/2006 Born ...................... G04C 3/066 368/162
11,422,510 B2 8/2022 Tombez
2005/0036405 A1 2/2005 Born et al.
2014/0143933 A1 * 5/2014 Low ...................... H02J 50/402 320/108
2015/0138935 A1 * 5/2015 Nagano .................. G04C 10/02 174/254
2019/0187623 A1 * 6/2019 Tombez ................. G04G 19/06
(Continued)

FOREIGN PATENT DOCUMENTS

EP 1241538 A1 * 9/2002 ............... G04C 3/08
JP 2005-106830 A 4/2005
(Continued)

*Primary Examiner* — Renee S Luebke
*Assistant Examiner* — Michael James Walker
(74) *Attorney, Agent, or Firm* — Harness, Dickey & Pierce, P.L.C.

(57) ABSTRACT

A mechanical watch includes a balance, an oscillation circuit configured to output a clock signal, a vibration detection unit configured to detect a vibration of the balance and output a vibration detection signal, a speed governing unit including a permanent magnet and a coil, a speed governing control unit, a storage unit configured to store an electrical energy, and a generator. One of the permanent magnet and the coil is held by the balance. The speed governing control unit compares the clock signal and the vibration detection signal and performs the speed governing control of the balance by exerting an electromagnetic force on the permanent magnet, the electromagnetic force being generated by outputting a current to the coil. When a stored energy amount is equal to or smaller than a predetermined value, the speed governing control unit switches a state to a stop state where the speed governing control of the balance is stopped.

9 Claims, 17 Drawing Sheets

(56) References Cited

U.S. PATENT DOCUMENTS

2020/0103827 A1 4/2020 Tombez et al.
2020/0117144 A1* 4/2020 Kobayashi ............... G04C 9/08
2024/0126212 A1 4/2024 Takyo et al.

FOREIGN PATENT DOCUMENTS

JP 2020-052047 A 4/2020
JP 2022-125746 A 8/2022
WO WO-2022176453 A1 * 8/2022 ............. G04C 10/00

* cited by examiner

MECHANICAL WATCH

BACKGROUND

The present application is based on, and claims priority from JP Application Serial Number 2023-018195, filed Feb. 9, 2023, the disclosure of which is hereby incorporated by reference herein in its entirety.

BACKGROUND

1. Technical Field

The present disclosure relates to a mechanical watch including a balance.

2. Related Art

JP-A-2020-52047 discloses a mechanical watch including a train wheel driven by a mechanical energy applied by a barrel including a spiral spring inside, a balance that governs the speed of the train wheel, and a control circuit that detects the motion of the balance with the sensor and measures the time draft of a sensor detection signal with respect to a digital reference signal output from an auxiliary oscillator including a crystal resonator and a watch circuit so as to activate the brake device in accordance with the time draft.

In JP-A-2020-52047, the electrical energy generated by a thermoelectric element and/or a photovoltaic cell as an energy source is stored in a storage device, and the control circuit is driven with the stored electrical energy.

In the mechanical watch disclosed in JP-A-2020-52047, when the voltage of the electrical energy stored in the storage device decreases, the speed governing control of the control circuit cannot be properly executed, which affects the operation of the balance serving as a mechanical resonator, and the time accuracy indicated by hands.

SUMMARY

A mechanical watch of the present disclosure includes a spiral spring, a balance configured to be driven by power from the spiral spring, an oscillation circuit configured to output a clock signal, a vibration detection unit configured to detect a vibration of the balance and output a vibration detection signal, a speed governing unit including a permanent magnet and a coil, a speed governing control unit configured to control the speed governing unit to perform a speed governing control of the balance, a storage unit configured to store an electrical energy to be supplied to the speed governing control unit, and a generator configured to generate the electrical energy, in which one of the permanent magnet and the coil is held by the balance, the speed governing control unit compares the clock signal and the vibration detection signal and performs the speed governing control of the balance by exerting an electromagnetic force on the permanent magnet, the electromagnetic force being generated by outputting a current to the coil, and when a stored energy amount of the storage unit is equal to or smaller than a predetermined value, the speed governing control unit switches a state to a stop state where the speed governing control of the balance is stopped.

DESCRIPTION OF EMBODIMENTS

A mechanical watch 1 of an embodiment is described below with reference to the drawings.

Figure 1:
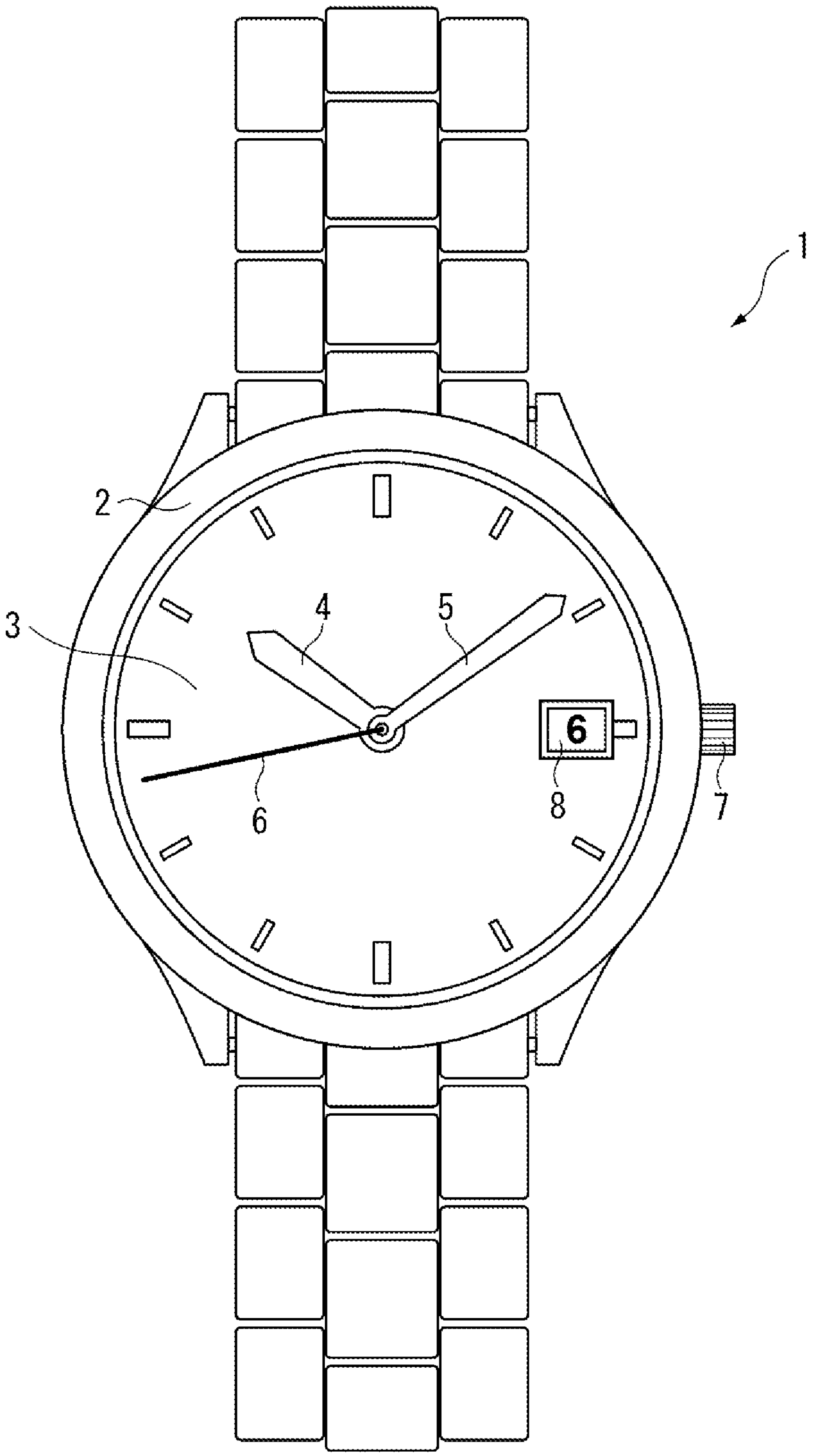
FIG. 1 is a front view illustrating a mechanical watch of an embodiment.

As illustrated in FIG. 1, the mechanical watch 1 includes a case 2, a dial 3, an hour hand 4, a minute hand 5, a seconds hand 6, a crown 7, and a date indicator 8.

Figure 2:
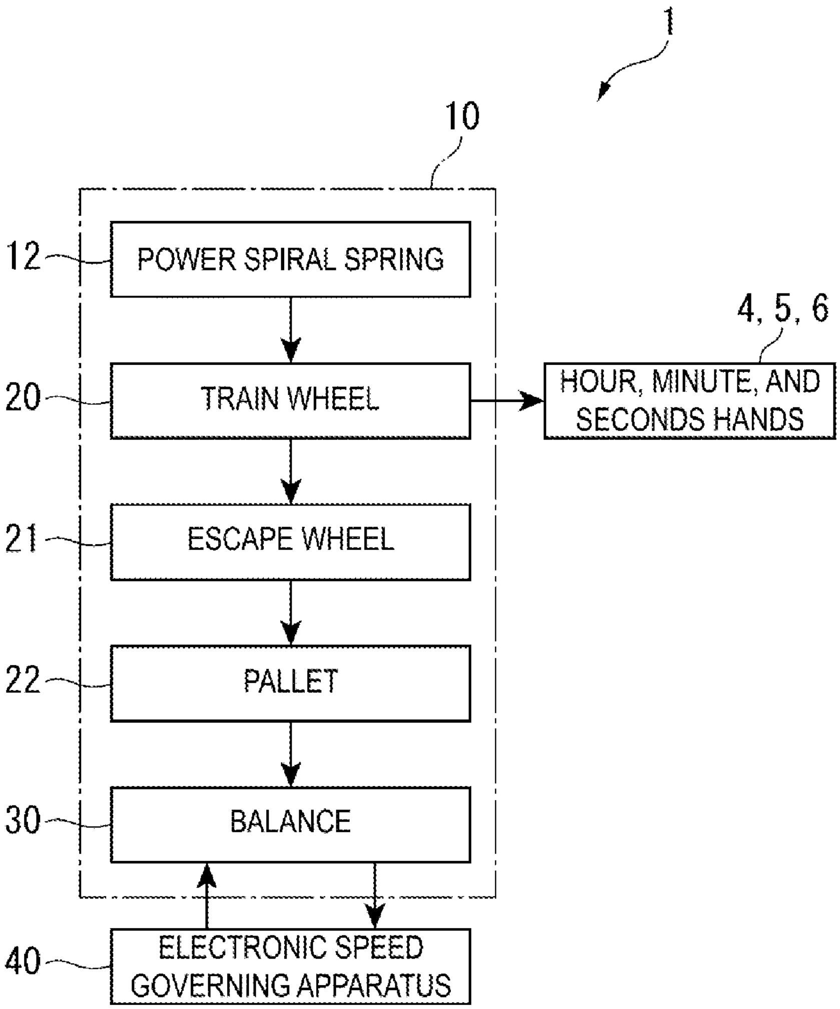
FIG. 2 is a block diagram illustrating a configuration of the mechanical watch.

As illustrated in FIG. 2, the mechanical watch 1 includes a mechanical movement 10, and an electronic speed governing apparatus 40 that improves the accuracy of the mechanical movement 10.

Figure 3:
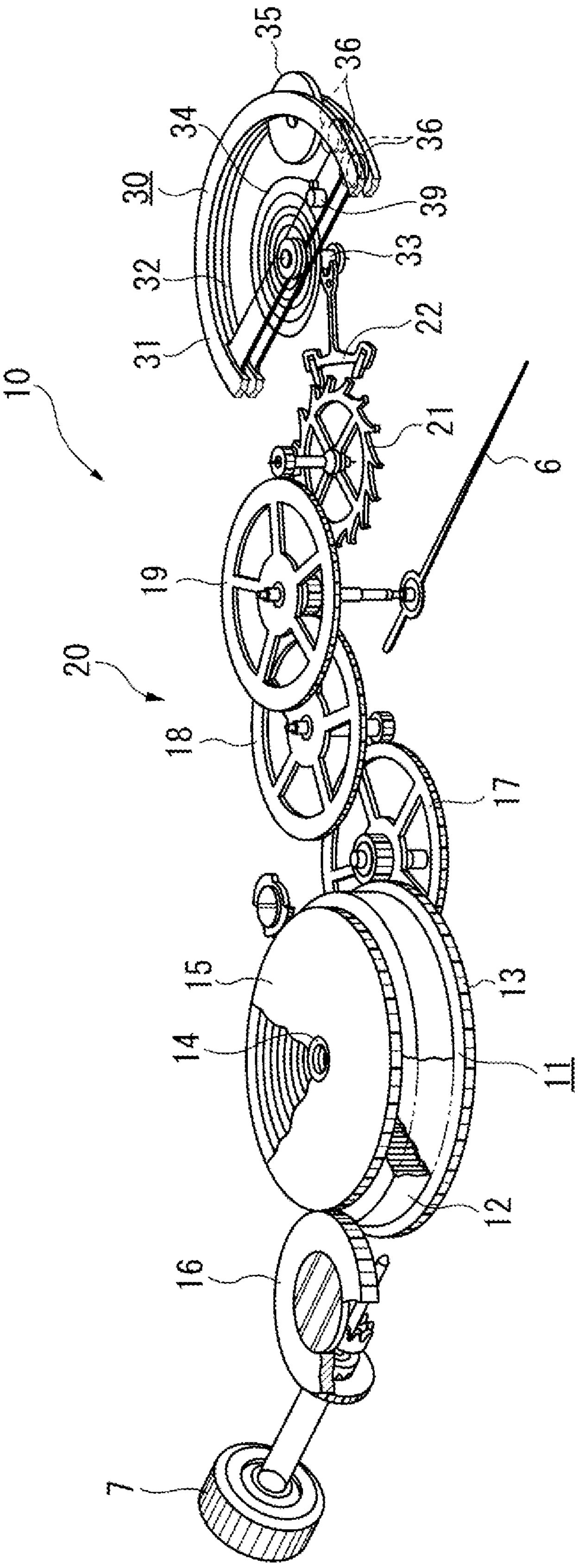
FIG. 3 is a schematic perspective view illustrating a configuration of a main part of the mechanical watch.

In the mechanical movement 10, the configuration of a balance 30 is mainly changed compared with mechanical movements of common mechanical watches. As also illustrated in FIG. 3, the mechanical movement 10 includes a barrel complete 11 composed of a power spiral spring 12, a barrel gear 13, a barrel stem 14 and a barrel lid. The spiral spring 12 is fixed to the barrel gear 13 at its outer end, and to the barrel stem 14 at its inner end. The barrel stem 14 is inserted to a supporting member provided in the main plate and fixed by a square hole screw so as to rotate together with a ratchet wheel 15. The ratchet wheel 15 is rotated by the crown 7 through a crown wheel 16 and the like, and the spiral spring 12 is wound up.

The rotation speed of the barrel gear 13 is increased by wheels, namely a center wheel 17, a third wheel 18 and a fourth wheel 19 serving as a speed-increasing train wheel. These gears 17 to 19 are pivotally supported by the main plate, the train wheel support and the like. The gears 17 to 19 make up a train wheel 20 that transmits the mechanical energy from the spiral spring 12. Note that FIG. 3 illustrates only the seconds hand 6 fixed to a center seconds pinion that engages with the third wheel 18, but in practice the minute hand 5 and the hour hand 4 that are driven through a cannon pinion and an hour wheel not illustrated in the drawing are also provided.

The mechanical movement 10 includes an escapement including an escape wheel 21 and a pallet 22, and a speed governor including the balance 30. The escapement maintains the vibration of the speed governor by supplying little by little to the speed governor the mechanical energy supplied from the spiral spring 12 through the fourth wheel 19, and controls the rotational speed of a train wheel 20 in accordance with the vibration cycle of the speed governor.

Figure 4:
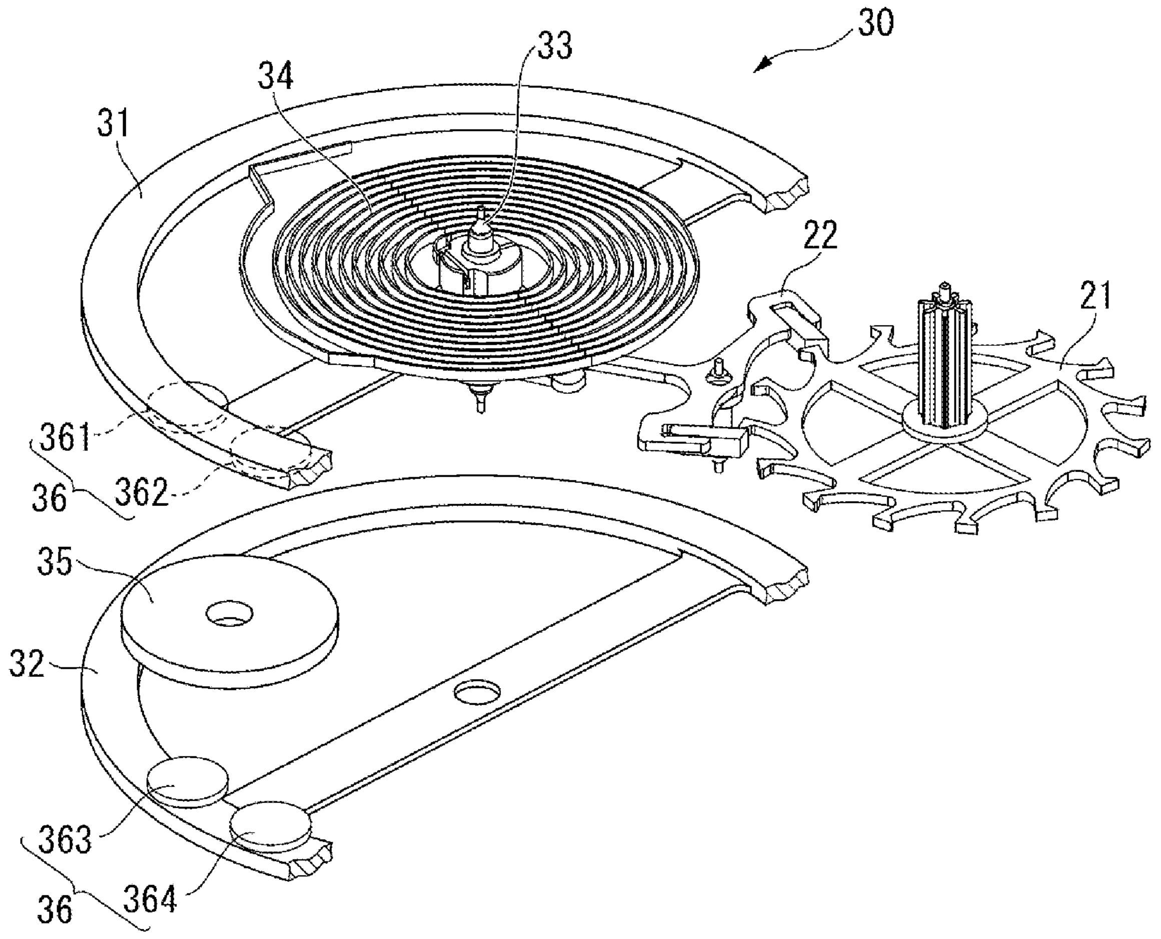
FIG. 4 is an exploded perspective view illustrating a balance, a pallet and an escape wheel of the mechanical watch.
Figure 5:
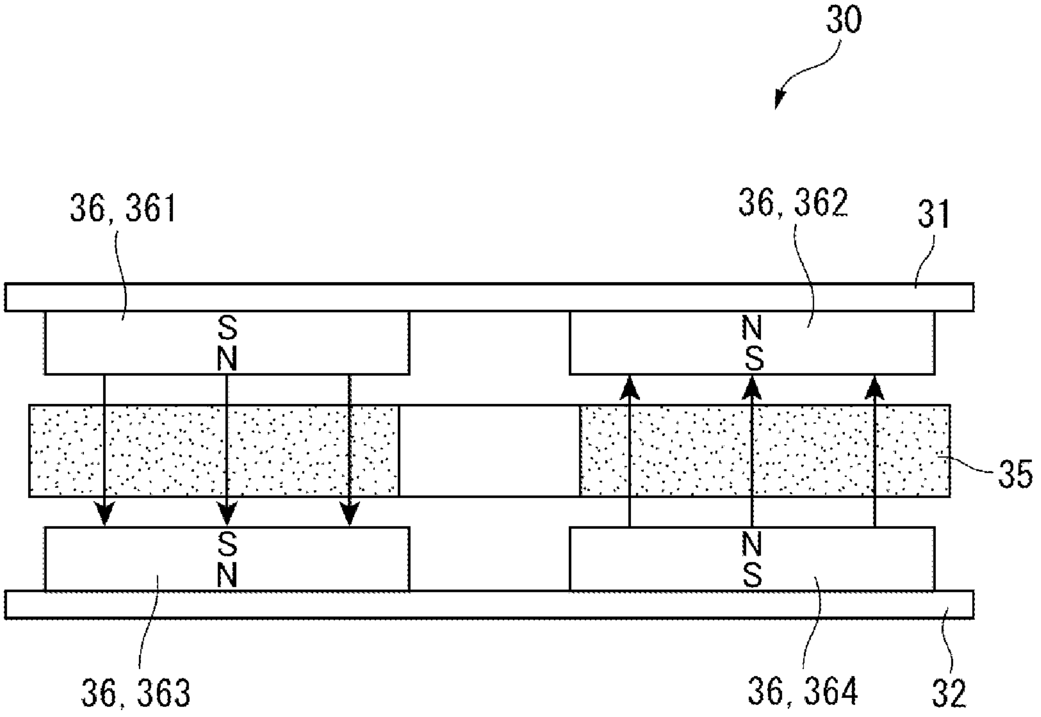
FIG. 5 is a side view illustrating a permanent magnet and a coil of the balance of the mechanical watch.
Figure 6:
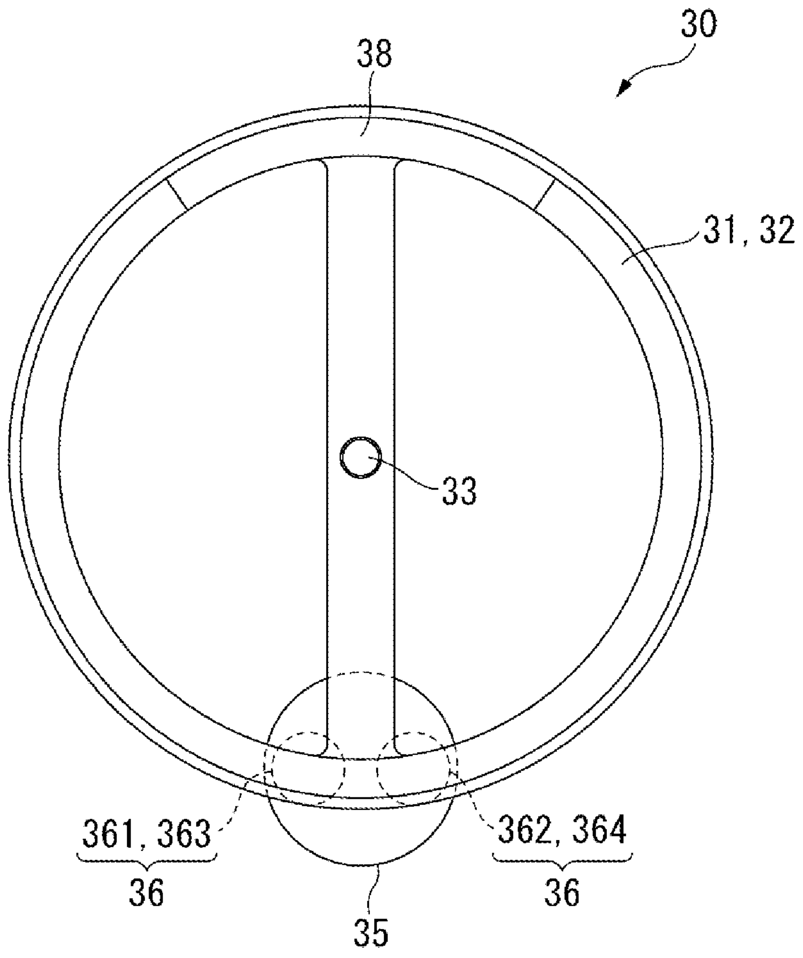
FIG. 6 is a plan view illustrating a balance wheel, a permanent magnet and a coil of the mechanical watch.

As also illustrated in FIGS. 4 to 6, the balance 30 includes upper and lower balance wheels 31 and 32, a balance stem 33, and a balance spring 34. The balance 30 is provided with the thin balance spring 34 inside the balance wheels 31 and 32, and the balance spring 34 is fixed at its one end to the balance stem 33, which is the axis of the balance wheels 31 and 32, and fixed at the opposite end to the watch body through stud support 39. The balance wheels 31 and 32 of the balance 30 vibrate by repeating regular reciprocating rotational movement with expansion and contraction of the isochronous balance spring 34.

A permanent magnet 36 is attached to the opposing surfaces of the balance wheels 31 and 32 opposite to each other as also illustrated in FIG. 5. The permanent magnet 36 is composed of a button-shaped neodymium magnet or the like, and includes the permanent magnets 361 and 362 attached to the balance wheel 31, and the permanent magnets 363 and 364 attached to the balance wheel 32.

A coil 35 is disposed between the upper and lower balance wheels 31 and 32. As described later, the coil 35 serves as a drive coil that governs the vibration speed of the balance 30 by applying a braking force and a driving force to the balance 30, a detection coil that detects the vibration state of the balance 30, and a power generation coil that generates power through the relative movement of the permanent magnet 36 and the coil 35.

The permanent magnet 361 and the permanent magnet 363 are attached at positions opposite to each other in the axis direction of the balance stem 33 with the coil 35 therebetween, and fixed to the balance wheels 31 and 32 such that the permanent magnet 361 is the N pole on the coil 35 side and the permanent magnet 363 is the S pole on the coil 35 side.

The permanent magnet 362 and the permanent magnet 364 are attached at positions opposite to each other in the axis direction of the balance stem 33 with the coil 35 therebetween, and fixed to the balance wheels 31 and 32 such that the permanent magnet 362 is the S pole on the coil 35 side and the permanent magnet 364 is the N pole on the coil 35 side.

In this manner, as illustrated in FIG. 5, the line of magnetic force from the N pole to the S pole is in the direction from the permanent magnet 361 to the permanent magnet 363 and the direction from the permanent magnet 364 to the permanent magnet 362, and the coil 35 is provided orthogonal to these lines of magnetic force.

The balance wheels 31 and 32 make a left and right reciprocating rotational movement together with the balance spring 34 with the balance stem 33 at the center, and the permanent magnet 36, which is fixed to the balance wheels 31 and 32, makes a left and right reciprocating rotational movement together. The coil 35 is fixed to the support plate of the mechanical movement 10 not illustrated in the drawing. In a plan view as viewed in the axis direction of the balance stem 33 as illustrated in FIG. 6, the coil 35 is disposed at a position where it overlaps the permanent magnet 36 when the permanent magnet 36 making a left and right reciprocating rotational movement passes through the intermediate position in the forward and backward paths.

In addition, the balance wheels 31 and 32 are unbalanced in weight due to the permanent magnets 361 and 362, 363, 364 attached thereto. In view of this, in the balance wheels 31 and 32, a weight balance adjustment weight 38 is attached on the side opposite to the permanent magnet 36 with respect to the balance stem 33.

Figure 7:
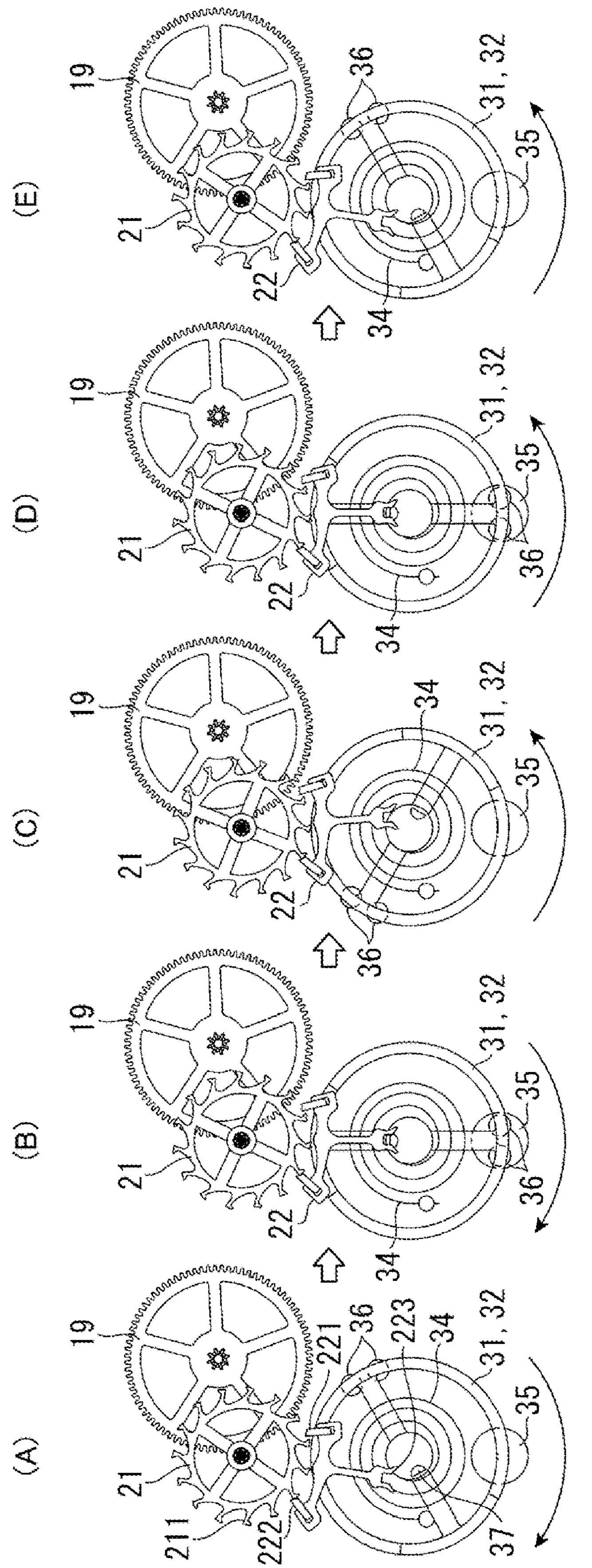
FIG. 7 is an explanatory view of an operation of the balance of the mechanical watch.

FIG. 7 is an explanatory view of movements of the escape wheel 21, the pallet 22 and the balance 30.

When the escape wheel 21 rotates through the train wheel 20 with the mechanical energy accumulated in the spiral spring 12, pallet stones 221 and 222 of the pallet 22 are pushed by a tooth 211 of the escape wheel 21, and a hoe 223 on the side opposite to the pallet stones 221 and 222 of the pallet 22 moves left and right to push a roller jewel 37 of the balance 30 and rotate the balance wheels 31 and 32. The roller jewel 37 is made of friction-resistant artificial ruby, and is characterized by acting to stay at the center of the hoe 223, but it moves left and right when the hoe 223 moves left and right due to the pallet stones 221 and 222 of the pallet 22 pushed by the tooth 211 of the escape wheel 21, which rotates the balance wheels 31 and 32 left and right, and rotates the balance wheels 31 and 32 in the opposite direction from the state completely turned left and right by the balance spring 34.

Here, when the rotation angle of the balance wheels 31 and 32 is 270 degrees, FIG. 7A illustrates a state where the balance wheels 31 and 32 start to rotate left (clockwise) by the balance spring 34, after rotating right (counterclockwise). FIG. 7B illustrates a state where the balance wheels 31 and 32 have rotated left by 135 degrees, i.e., they are at the intermediate position in the left rotation. FIG. 7C illustrates a state where the balance wheels 31 and 32 have rotated left, i.e., they start to rotate right by the balance spring 34. In addition, FIG. 7D illustrates a state where the balance wheels 31 and 32 have rotated right by 135 degrees, i.e., they are at the intermediate position in the right rotation, and FIG. 7E illustrates a state where the balance wheels 31 and 32 have rotated right. In this manner, the state returns to the state of FIG. 7A to repeat the operations of FIGS. 7A to E.

In this embodiment, the coil 35 is disposed at the intermediate position in the right and left rotations of the balance wheels 31 and 32, and the permanent magnet 36 is disposed at a position that overlaps the coil 35 in plan view at the intermediate position.

Figure 8:
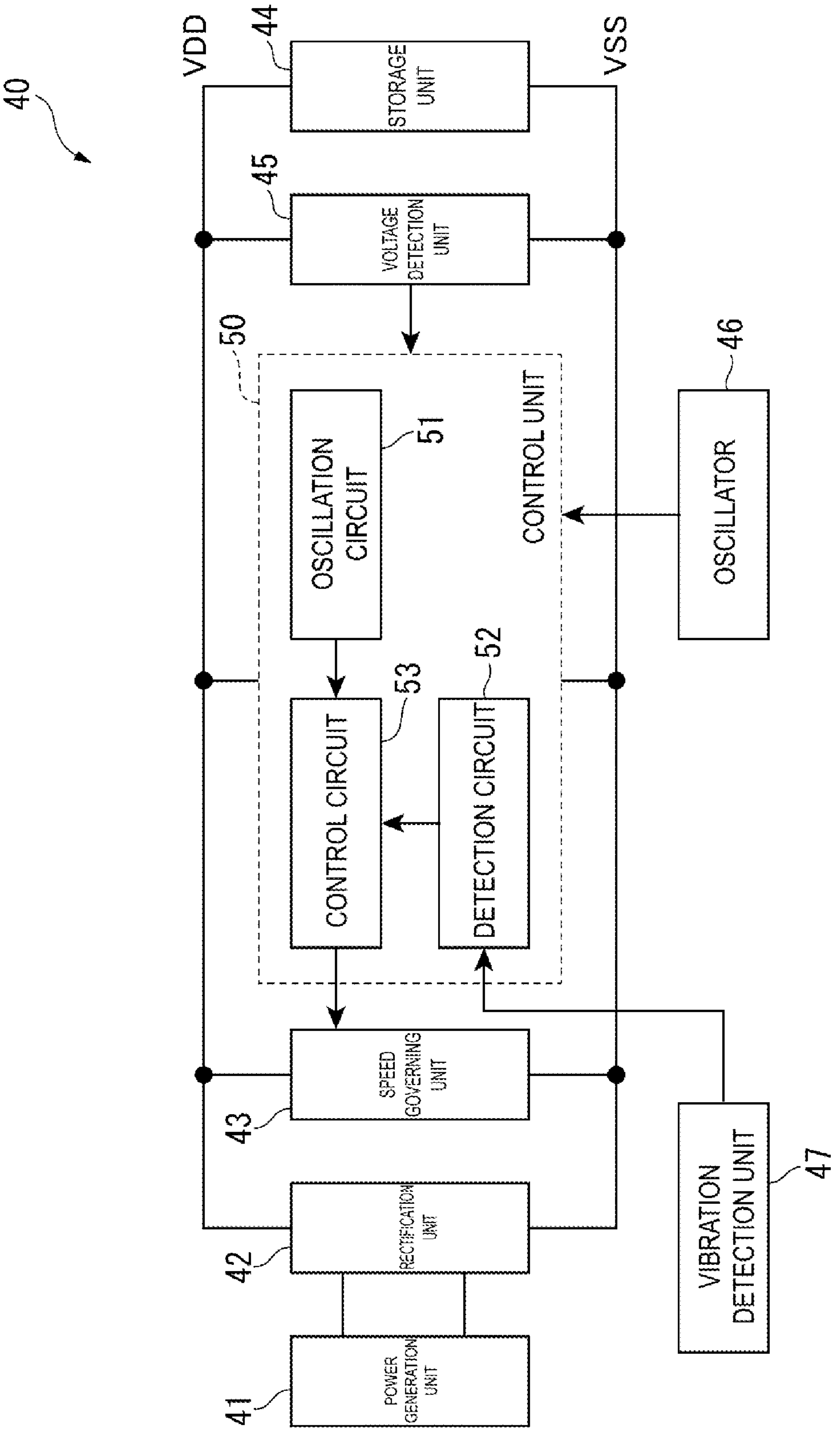
FIG. 8 is a circuit block diagram illustrating a configuration of an electronic speed governing apparatus of the mechanical watch.

The electronic speed governing apparatus 40 accurately adjusts the cycle of the reciprocating rotational movement of the balance 30. FIG. 8 is a circuit block diagram of the electronic speed governing apparatus 40. As illustrated in FIG. 8, the electronic speed governing apparatus 40 includes a power generation unit 41, a rectification unit 42, a speed governing unit 43, a storage unit 44, a voltage detection unit 45, a transducer 46, a vibration detection unit 47, and a control unit 50.

The power generation unit 41 is a generator that includes the permanent magnet 36 held by the balance 30 and the coil 35, and generates electrical energy. That is, the power generation unit 41 is an electromagnetic generator that generates power through relative movement of the permanent magnet 36 and the coil 35 along with the reciprocating rotational movement of the balance 30.

The rectification unit 42 is composed of a boost rectification, a full wave rectification, a half-wave rectification, a transistor rectification and the like, and rectifies the AC output from the power generation unit 41 to supply and charge it to the storage unit 44. Note that the rectification unit 42 is not provided when the power generation unit 41 is a DC generator such as a solar cell.

Figure 9:
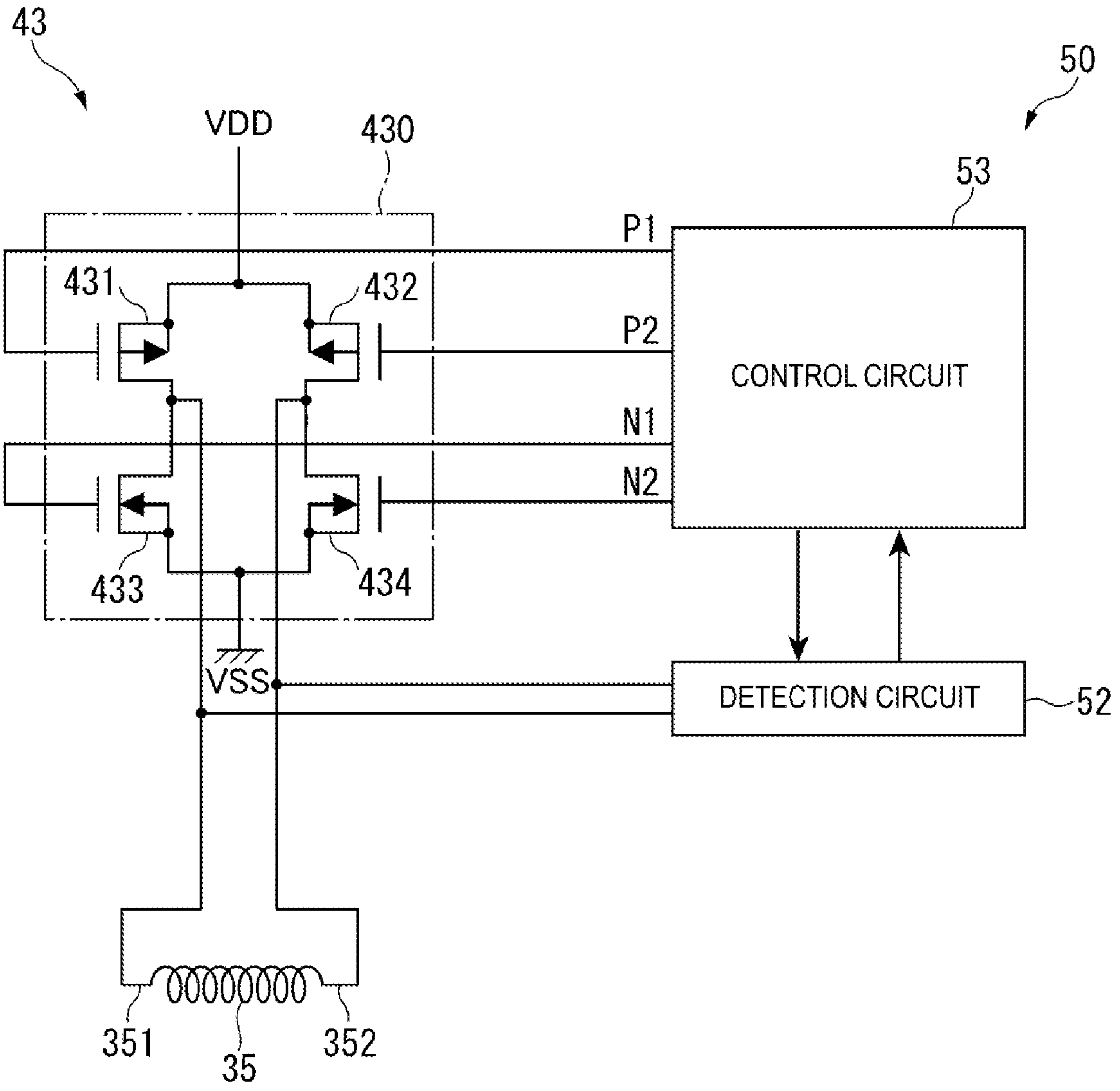
FIG. 9 is a circuit diagram illustrating a configuration of a speed governing unit of the mechanical watch.

The speed governing unit 43 is a speed governing unit that governs the speed of the reciprocating rotational movement of the balance 30, and includes the coil 35, the permanent magnet 36, and a power switch 430 illustrated in FIG. 9.

The power switch 430 is controlled by a control circuit 53, and includes a first switch 431, a second switch 432, a third switch 433 and a fourth switch 434 disposed between the coil 35 and power-source lines VDD and VSS that supply current to the coil 35. Specifically, the switches 431 to 434 are controlled on and off by control signals P1, P2, N1 and N2 output from the control circuit 53.

The first switch 431 is a P-channel field effect transistor coupled between a first terminal 351 of the coil 35 and the first power-source line VDD. The second switch 432 is a P-channel field effect transistor coupled between a second terminal 352 of the coil 35 and the first power-source line VDD.

The third switch 433 is a N-channel field effect transistor coupled between the first terminal 351 of the coil 35 and the second power-source line VSS. The fourth switch 434 is a N-channel field effect transistor coupled between the second terminal 352 of the coil 35 and the second power-source line VSS.

The storage unit 44 is composed of a secondary battery, a capacitor and the like. The storage unit 44 is coupled to the rectification unit 42, the speed governing unit 43, the voltage detection unit 45, and the control unit 50 through the first power-source line VDD and the second power-source line VSS. In this manner, the electrical energy generated by the power generation unit 41 is stored in the storage unit 44 through the rectification unit 42. In addition, the electrical energy stored in the storage unit 44 is supplied to the control unit 50 and the speed governing unit 43. With the storage unit 44, the control unit 50 can be operated with the electrical energy stored in the storage unit 44 even when the power generation of the power generation unit 41 is stopped, and thus the speed governing control of the balance 30 by the electronic speed governing apparatus 40 can be continued. In this manner, the storage unit 44 is a storage unit that stores the electrical energy to be supplied to the control circuit 53 serving as a speed governing control unit described later.

A solid-state battery may be used for the storage unit 44. Solid-state batteries have low battery capacity, but are characterized by almost no degradation in performance over time, making them suitable as the storage unit 44 of the mechanical watch 1 that can be continuously used for a long time. The mechanical watch 1 drives hands such as the hour hand 4, the minute hand 5 and the seconds hand 6 with the spiral spring 12, and the power generation unit 41 and the storage unit 44 need only to generate and store a small amount of power required for driving the IC making up the control unit 50. For example, the power consumption of the mechanical watch 1 that performs the electronic speed governing of this embodiment is about 1/20 of the power consumption of an analog quartz watch that operates hands by a step motor. Thus, the power generation unit 41 can use a small-sized generator with low power generation, and use the generator utilizing the electromagnetic induction of the permanent magnet 36 and the coil 35 through the reciprocating rotational movement of the balance 30. In addition, the storage unit 44 can use a secondary battery with low battery capacity, e.g., a solid-state battery.

The voltage detection unit 45 detects the voltage of the storage unit 44 and outputs the detection result to the control unit 50. In this manner, the voltage detection unit 45 detects the stored energy amount of the storage unit 44.

The transducer 46 is a crystal oscillator or a silicon MEMS transducer. MEMS is an abbreviation for Micro Electro Mechanical Systems, and when MEMS resonators are used, they are less precise than crystal oscillators, but can reduce the size. The transducer 46 outputs a clock signal of a predetermined frequency to the control unit 50.

The vibration detection unit 47 detects the vibration of the balance 30, and outputs the vibration waveform to a detection circuit 52. The vibration detection unit 47 includes the coil 35 used also as the drive coil and the power generation coil for the purpose of component commonality, and the permanent magnet 36 held by the balance wheels 31 and 32. The use of the driving and power generating coil 35 also for vibration detection is advantageous in size reduction and cost reduction of the mechanical watch 1 compared with a case where a dedicated vibration detection unit 47 is separately provided.

Note that the vibration detection unit 47 needs only to detect the reciprocating rotational movement of the balance wheels 31 and 32, and therefore may be of light detection type using a LED and a phototransistor. The light detection type consumes more power during detection than the magnetism detection type using the coil 35, but has the advantage of not being affected by external magnetic field noise. In addition, the vibration detection unit 47 may be of machine contact type, which causes large friction loss but has the advantage of not being affected by external magnetic field noise.

In this embodiment, when the balance 30 vibrates, the permanent magnet 36 moves relative to the coil 35, and thus an induction voltage is generated at the coil 35. The induction voltage waveform generated at the coil 35 is opposite between the waveform of the forward path of the balance 30 illustrated in FIG. 10A and the waveform of the backward path of the balance 30 illustrated in FIG. 10B, and the vibration phase of the balance 30 can be detected by detecting the peak value of the largest amplitude of the induction voltage. For example, when the one half cycle of the balance 30 is set to one vibration and it is set to vibrate 6 times per second, the detection circuit 52 described later detects the detection signal a total of six times, three times in the forward path and three times in the backward path, per second.

As illustrated in FIG. 8, the control unit 50 includes an oscillation circuit 51, the detection circuit 52, and the control circuit 53.

The oscillation circuit 51 oscillates the transducer 46, divides the oscillation signal and outputs a reference clock of a predetermined frequency to the control circuit 53. The frequency of the reference clock is set based on the vibration cycle of the balance 30. For example, when the balance 30 is set to vibrate 6 times per second, it suffices to set the frequency of the reference clock to 6 Hz.

As also illustrated in FIG. 9, the detection circuit 52 is coupled to the first terminal 351 and the second terminal 352 of the coil 35, and detects the current flowing through the coil 35 with the permanent magnet 36 that moves relative to the coil 35 along with the vibration of the balance 30. Specifically, the detection circuit 52 detects the induction voltage waveform output from the coil 35 serving as the vibration detection unit 47 for each vibration of the balance 30, and outputs the vibration detection signal to the control circuit 53.

As such, in this embodiment, the coil 35 and the permanent magnet 36 make up the vibration detection unit 47, and the vibration detection unit is configured with the vibration detection unit 47 and the detection circuit 52.

The control circuit 53 controls the power switch 430 at an appropriate timing of the vibration phase of the balance 30 to switch the direction of the current flowing through the coil 35 and apply to the permanent magnet 36 the effect of the electromagnetic force generated by the current supplied to the coil 35, and thus can provide the accelerating driving force or the decelerating braking force for the balance 30. In this manner, the control circuit 53 is a speed governing control unit that governs the speed of the balance 30 by controlling the speed governing unit.

Specifically, the control circuit 53 compares the input timing of the reference clock input from the oscillation circuit 51 and the input timing of the vibration detection signal input from the detection circuit 52. When the vibration detection signal is advanced than the reference clock, the switches 431 to 434 are controlled such that the current flows in the direction in which the braking force is generated at the coil 35 at the timing of providing the braking force to the balance 30. In addition, when the vibration detection signal is delayed than the reference clock, the switches 431 to 434 are controlled such that the current flows in the direction in which the driving force is generated at the coil 35 at the timing of providing the driving force to the balance 30.

In addition, when the voltage of the storage unit 44 detected at the voltage detection unit 45 is equal to or smaller than a speed governing stop voltage, i.e., when the stored energy amount of the storage unit 44 is equal to or smaller than the predetermined value, the control circuit 53 switches the state to the stop state where the speed governing control of the balance 30 is stopped and turns off the switches 431 to 434 to decouple the power-source lines VDD and VSS and the coil 35. As a result, no electromagnetic force is generated because no current flows through the coil 35, and the permanent magnet 36 of the balance 30 is not affected, and thus, the vibration cycle of the balance 30 becomes the accuracy of a typical mechanical watch set by the balance spring 34.

Next, a speed governing control of the balance 30 is described with reference to the flowcharts of FIGS. 11 and 12, and the timing diagram of FIG. 13.

In the mechanical watch 1, activation is started when the spiral spring 12 is wound up by the crown 7. Specifically, when the escape wheel 21 is rotated through the train wheel 20 by the mechanical energy accumulated in the spiral spring 12, the pallet 22 sways left and right, and the balance wheels 31 and 32 of the balance 30 vibrate in the left-right direction. The permanent magnet 36 and the coil 35 relatively move with the vibration of the balance wheels 31 and 32 to generate an electromotive force at the coil 35, and the generated electrical energy is stored in the storage unit 44 to increase the voltage of the storage unit 44 and activate the system such as the control unit 50, and thus, the transducer 46 is activated by the oscillation circuit 51. As such, the control circuit 53 of the control unit 50 executes step S1 at the start of activation, and determines whether oscillation of the transducer 46 has been detected.

When it is determined at step S1 that no oscillation has been detected, the control circuit 53 continues the detection of the oscillation. When it is determined at step S1 that oscillation has been detected, the control circuit 53 executes step S2 to detect the voltage of the storage unit 44 by the voltage detection unit 45.

Next, the control circuit 53 executes step S3 to determine whether the voltage of the storage unit 44 equal to or greater than a predetermined voltage value set in advance, i.e., equal to or greater than the speed governing start voltage has been detected. When it is determined to be NO at step S3, the control circuit 53 repeats the processing of the steps S2 and S3.

When it is determined to be YES at step S3, the control circuit 53 executes step S10 to start the balance speed governing control.

Figure 10:
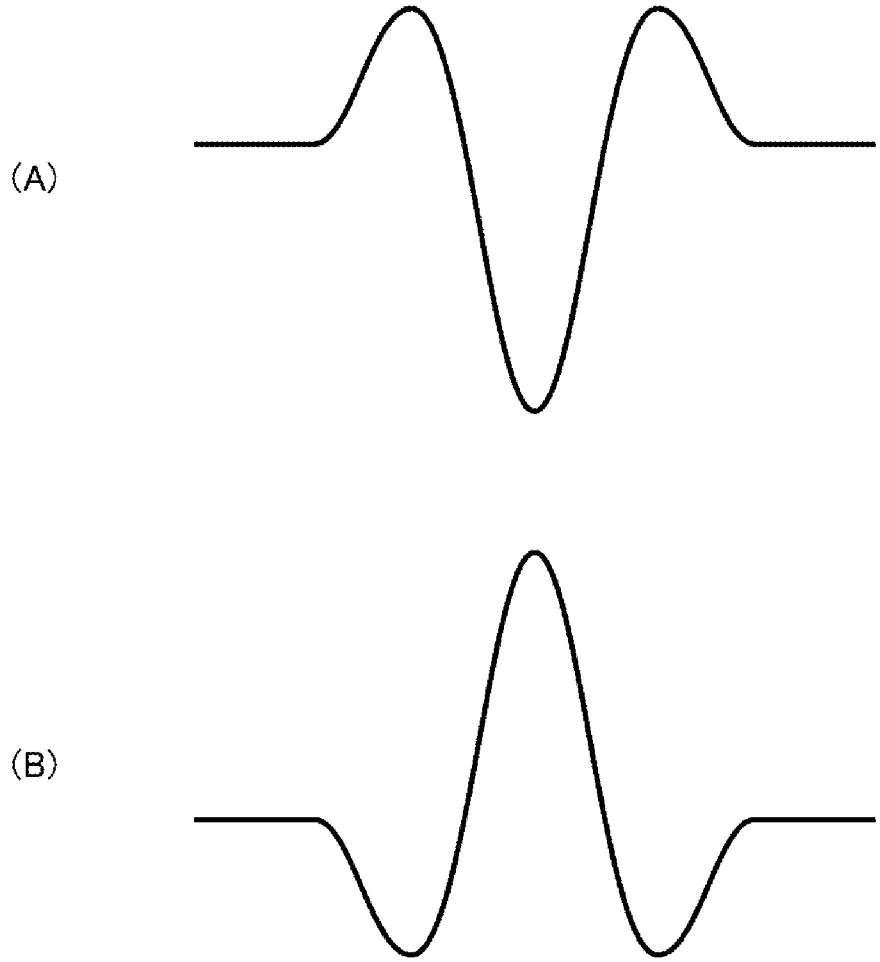
FIG. 10 is a waveform diagram illustrating a vibration detection waveform of the mechanical watch.
Figure 12:
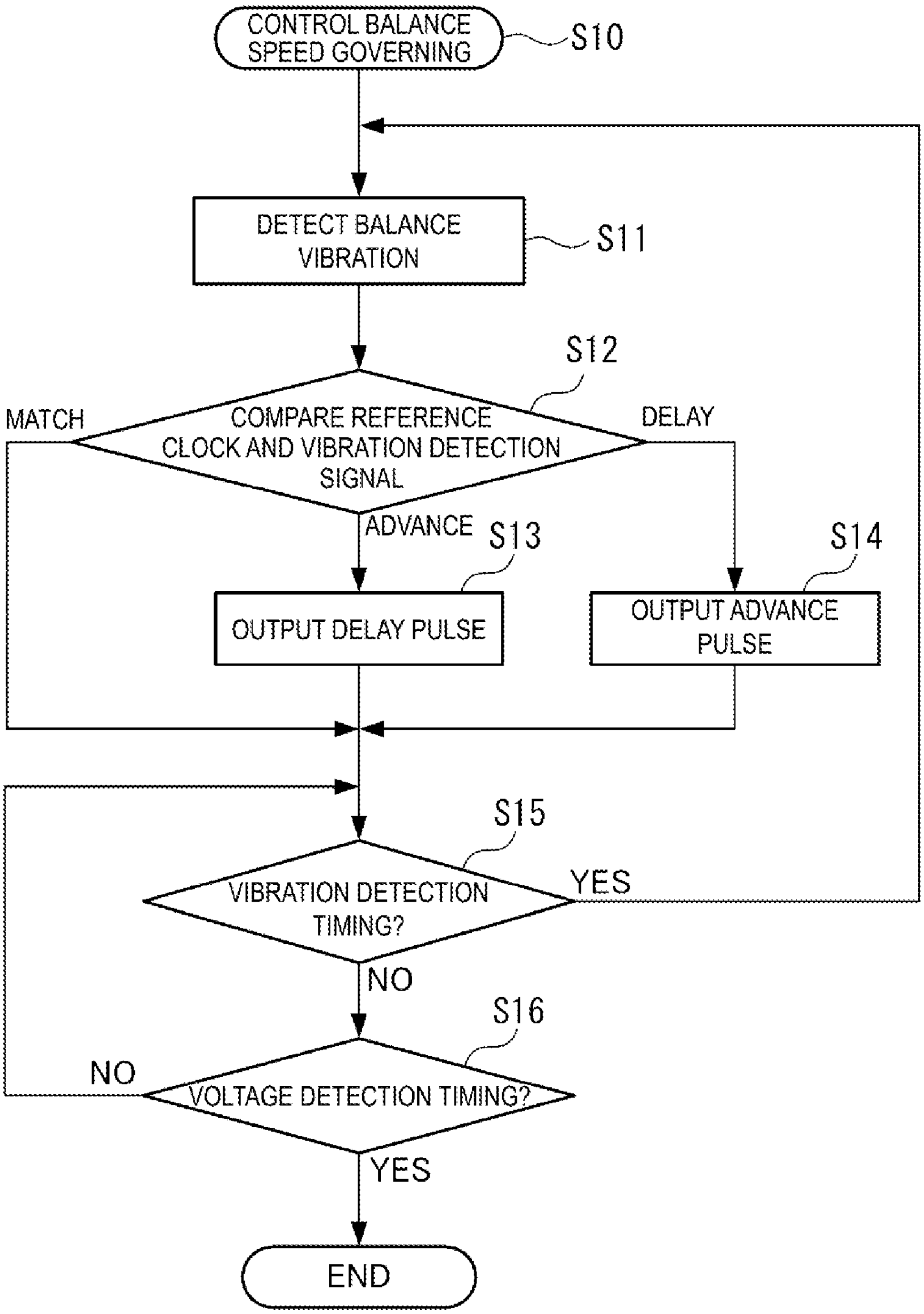
FIG. 12 is a flowchart illustrating a balance speed governing control of the mechanical watch.

When the control circuit 53 starts the balance speed governing control of step S10, it executes step S11 to detect the balance vibration as illustrated in FIG. 12. Specifically, the control circuit 53 controls the power switch 430 to set a vibration detection state capable of detecting the vibration of the balance 30 by the coil 35. For example, as illustrated in FIG. 13, in the detection period for detecting the vibration of the balance 30, only the first switch 431 or the second switch 432 coupled to the power-source line VDD are turned on with the remaining switches turned off, and the detection coil 35 serving also as the drive coil is coupled to the reference potential. When the balance wheels 31 and 32 rotate and the permanent magnet 36 comes closer to the coil 35, an induction voltage waveform is generated at the coil 35 as illustrated in FIG. 10. In this manner, the detection circuit 52 can detect a rotation to the vibration detection position set by the vibration phase i.e., the positional relationship between the permanent magnet 36 and the coil 35 held by the balance wheels 31 and 32, and the rotational direction of the balance wheels 31 and 32.

The control circuit 53 executes step S12 to compare the reference clock input from the oscillation circuit 51 and the vibration detection signal input from the detection circuit 52, and detect whether the vibration of the balance wheels 31 and 32 is advanced or delayed than a preset value, e.g., six vibrations per second, or, the vibration matches the preset value.

When it is determined that the vibration of the balance wheels 31 and 32 is advanced than the preset value, the control circuit 53 executes step S13, and outputs a delay pulse to apply a braking force to the balance wheels 31 and 32. When it is determined that the vibration of the balance wheels 31 and 32 is delayed than the preset value, the control circuit 53 executes step S14, and outputs an advance pulse to apply a driving force to the balance wheels 31 and 32. In addition, when it is determined that the vibration of the balance wheels 31 and 32 matches the preset value and that the speed governing is unnecessary, the control circuit 53 does not output the speed governing pulse.

The delay pulse and advance pulse are speed governing control signals that turns on the pair of the first switch 431 and the fourth switch 434, or the second switch 432 and the third switch 433, and is a fixed width pulse set in advance in this embodiment.

In a speed governing state for governing the balance 30, the control circuit 53 generates the electromagnetic force by supplying current to the coil 35 by turning on the first switch 431 and the fourth switch 434 or turning on the second switch 432 and the third switch 433 by outputting to the power switch 430 the delay pulse or advance pulse at an appropriate timing when the permanent magnet 36 of the balance wheels 31 and 32 overlaps the coil 35. By changing the direction of the current flowing through the coil 35, it is possible to control the suction or repulsion force of the electromagnetic force in a switching manner for the permanent magnet 36 attached to the balance wheels 31 and 32.

In this manner, it is possible to achieve deceleration through application of a braking force, or acceleration through application of a driving force to the balance 30. For example, the vibration of the balance wheels 31 and 32 can be decelerated by generating a suctioning electromagnetic force for the permanent magnet 36 with the vibration of the balance wheels 31 and 32 at a timing when the permanent magnet 36 starts to separate from the coil 35. Conversely, the vibration of the balance wheels 31 and 32 can be accelerated by generating a repulsive electromagnetic force for the permanent magnet 36 at a timing when the permanent magnet 36 starts to separate from the coil 35.

Figure 13:
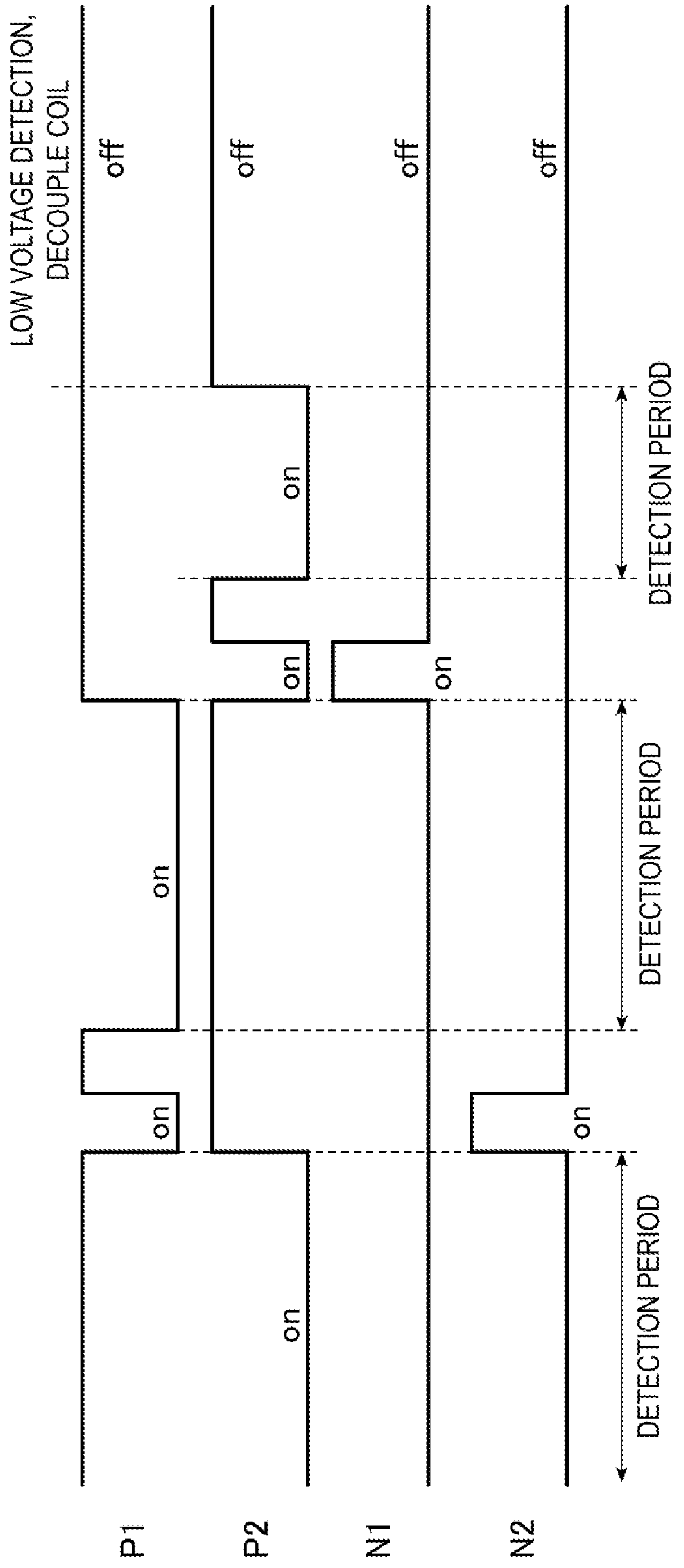
FIG. 13 is a timing diagram illustrating a speed governing control signal for the balance speed governing control of the mechanical watch.

In the timing diagram illustrated in FIG. 13, the speed governing control is performed with the first switch 431 and the fourth switch 434 set to on in accordance with the detection result of the first detection period. The speed governing control is performed with the second switch 432 and the third switch 433 different from the last time set to on in accordance with the detection result of the next detection period. It should be noted that the same switch as the last time may be controlled to on depending on the detection result of each detection period. Specifically, the control circuit 53 controls which switch is to be turned on in accordance with the rotational direction of the balance wheels 31 and 32, and the type of pulse, i.e., whether the delay pulse or advance pulse, output from the control circuit 53. In addition, in the period until the next detection period after the output of the delay pulse or advance pulse, the control circuit 53 switches all switches 431 to 434 to off to electrically decouple the first terminal 351 and the second terminal 352 of the coil 35 from the first power-source line VDD and the second power-source line VSS, thus controlling the state to the open state.

Next, the control circuit 53 executes step S15 to determine whether the vibration detection timing has reached. For example, when the balance wheels 31 and 32 are set to vibrate six times per second, the vibration detection timing is set for every ⅙ second. In this manner, when the elapsed time after the last vibration detection timing reaches ⅙ seconds, the control circuit 53 determines it to be YES at step S15, and returns to the balance vibration detection processing of step S11 to continue the balance speed governing control.

On the other hand, when it is determined to be NO at step S15 the control circuit 53 executes step S16 to determine whether the voltage detection timing has reached. The voltage detection timing is set to an interval of a predetermined time, e.g., an interval of 60 seconds, and when the predetermined time has not elapsed from the last voltage detection, the control circuit 53 determines it to be NO at step S16 and returns to step S15 to continue the processing.

Figure 11:
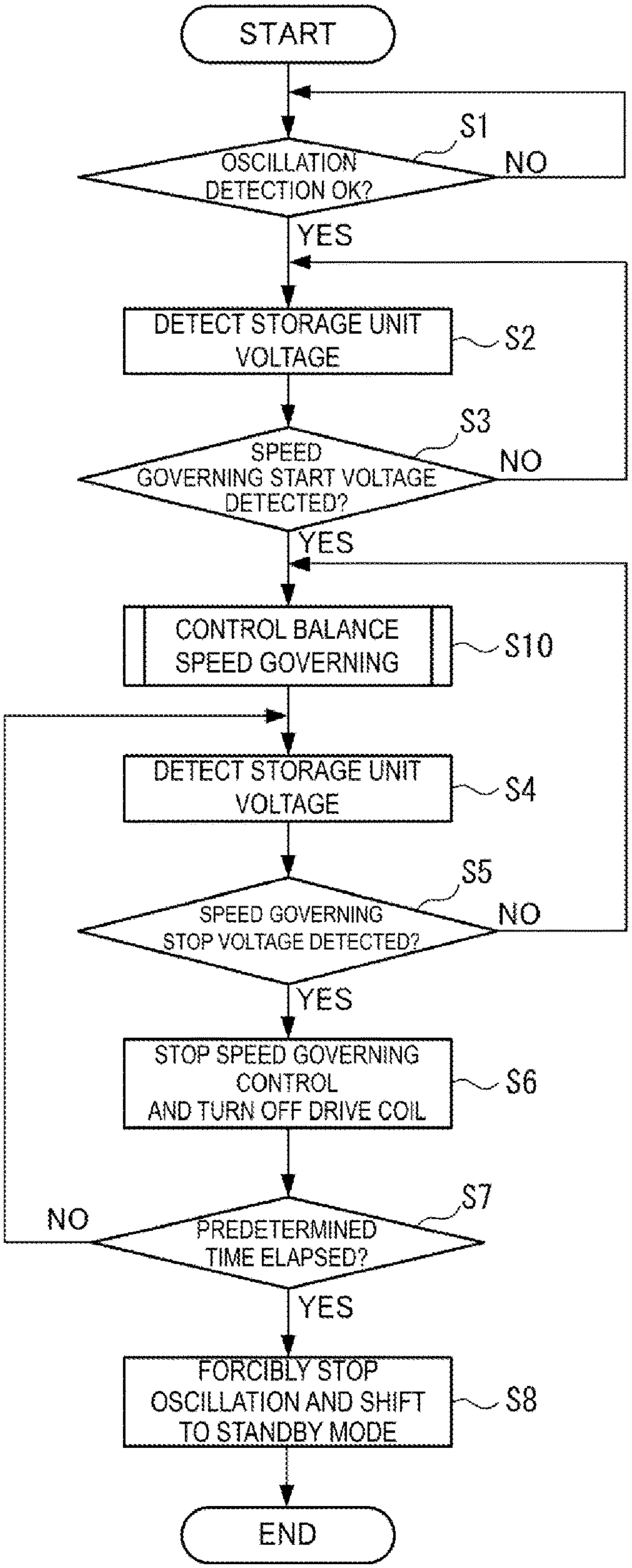
FIG. 11 is a flowchart illustrating a speed governing control of the mechanical watch.

On the other hand, when it is determined to be YES at step S16, the control circuit 53 terminates the balance speed governing control of step S10 once, and executes step S4 as illustrated in FIG. 11 to detect the voltage of the storage unit 44 by the voltage detection unit 45.

Next, the control circuit 53 executes step S5 to determine whether the voltage of the storage unit 44 is not greater than the speed governing stop voltage set in advance. The speed governing stop voltage is a voltage higher than the operation voltage of the control unit 50 as an IC. In addition, the speed governing stop voltage is a voltage higher than the oscillation stoppage voltage of the transducer 46. Further, the speed governing stop voltage and the speed governing start voltage may be the same voltage, but the speed governing start voltage may be set to a voltage higher than the speed governing stop voltage in order to prevent a shift to the speed governing stop state in a short time after the start of the speed governing control.

When it is determined to be NO at step S5, the control circuit 53 restarts the balance speed governing control of step S10.

When it is determined to be YES at step S5, the control circuit 53 executes step S6 to stop the speed governing control, and switches all switches 431 to 434 to off as illustrated in FIG. 13 to electrically decouple the first terminal 351 and the second terminal 352 of the coil 35 from the first power-source line VDD and the second power-source line VSS and set the open state, thus switching the speed governing control of the electronic speed governing apparatus 40 to the stop state.

When the coil 35 is set to the open state, no electromagnetic force is generated at the coil 35, and only the mechanical speed governing control of the balance spring 34 is performed for the balance 30 as in common mechanical watches. As a result, the accuracy of the mechanical watch 1 cannot maintain the monthly rate accuracy of quartz watches, e.g., a monthly rate of ±15 seconds, but can maintain the daily rate accuracy as that of common mechanical watches.

Next, the control circuit 53 executes step S7 to determine whether a predetermined time, e.g., 24 hours, has elapsed after the stop of the speed governing control of step S6. When it is determined to be NO at step S7, the control circuit 53 returns to step S4 to continue the control. In this manner, even if the voltage of the storage unit 44 is temporarily reduced, the balance speed governing control can be restated when the voltage subsequently becomes greater than the speed governing stop voltage. For example, when the reason for the voltage drop of the storage unit 44 is reduction of the mechanical energy applied to the train wheel 20 due to unwinding of the spiral spring 12, the balance speed governing control can be restarted by increasing the voltage of the storage unit 44 by winding up the spiral spring 12 by the user.

When it is determined to be YES at step S7, i.e., when a predetermined time has elapsed with the voltage of the storage unit 44 still reduced to the speed governing stop voltage or lower, the control circuit 53 executes step S8 to shift to a standby mode of maintaining the storage energy by suppressing the energy consumption by stopping the oscillation of the transducer 46 by forcibly stopping the power supply to the oscillation circuit 51, such that the voltage with which the control unit 50 i.e., the IC, can operate is maintained in preparation for the activation after the next power generation.

When the user winds up the spiral spring 12 to start the activation in the standby mode, the control from step S1 in FIG. 11 is executed.

In the above-described manner, the control circuit 53 serving as the speed governing control unit controls the on and off of the switches 431 to 434 to control and switch the state among the vibration detection state of detecting the vibration of the balance 30, the speed governing state of governing the balance 30 by controlling the direction of the current flowing through the coil 35, and the stop state where the switches 431 to 434 are controlled to off and no current flows through the coil 35.

Effects of Embodiment

According to this embodiment, in the mechanical watch 1 that moves hands by operating the train wheel 20 with the spiral spring 12 and governs the speed with the escape wheel 21, the pallet 22 and the balance 30, the vibration speed of the balance 30 can be governed based on the comparison result of the vibration detection signal representing a detected vibration of the balance 30 as a speed governor and the clock signal from the transducer 46, and thus the time accuracy of the mechanical watch 1 can be improved to the level of the quartz watches.

When the electrical energy of the storage unit 44 is reduced and the electronic speed governing cannot be performed due to the voltage reduced to a voltage equal to or smaller than the speed governing stop voltage, the state is switched to the stop state where the power switch 430 is turned off and the coil 35 is decoupled from the power-source lines VDD and VSS, and thus it is possible to reliably prevent the coil 35 from affecting the mechanical speed governing of the balance 30. In this manner, in the speed governing control stop state, the time accuracy indicated by hands can be maintained at the accuracy of common mechanical watches, and the time accuracy can be prevented from being significantly reduced.

In addition, by setting the power switch 430 to off also in the period until the next detection period after the output of the delay pulse or advance pulse, the control circuit 53 can prevent the coil 35 from affecting the mechanical speed governing of the balance 30.

The speed governing of the balance 30 is performed with the permanent magnet 36 provided at the balance wheels 31 and 32 and the coil 35 that generates an electromagnetic force with a current supplied thereto, and thus the decelerating speed governing through application of the braking force to the balance 30 and the accelerating speed governing through application of the driving force to the balance 30 can be executed. Especially, since the balance 30 can be accelerated, the speed governing can be performed in the region where the torque of the spiral spring 12 is small, i.e., the period in which the rewinding speed is low.

Figure 14:
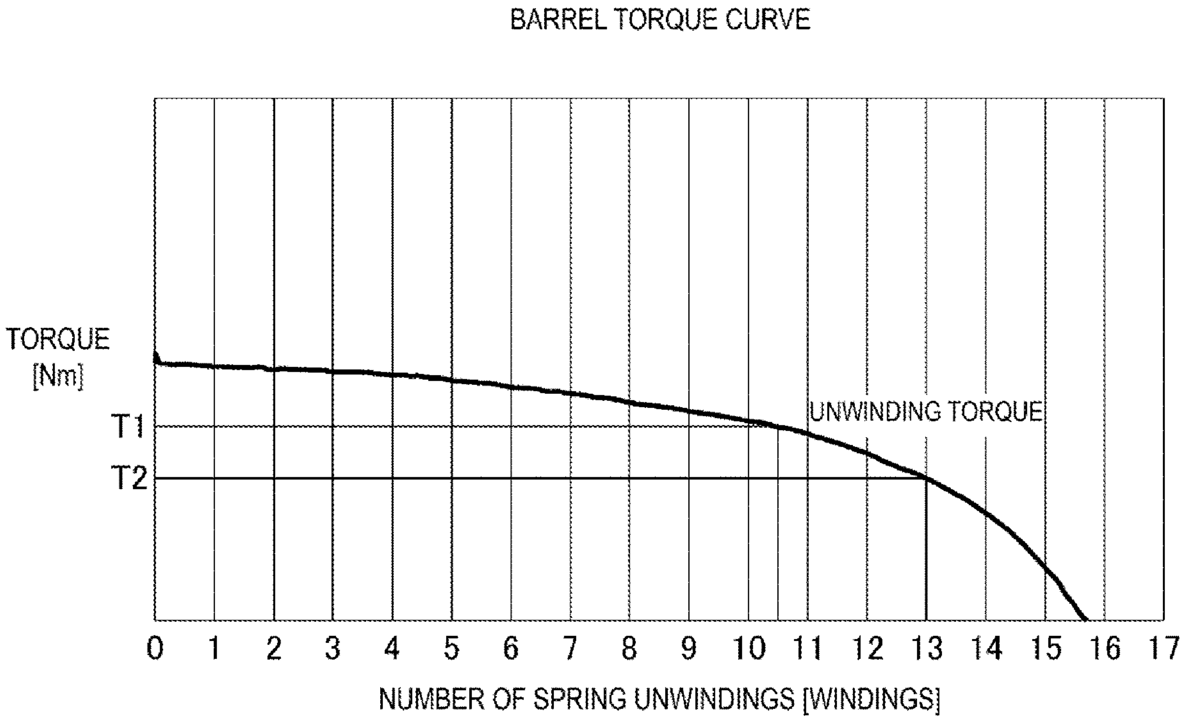
FIG. 14 is a graph illustrating a barrel torque curve of the mechanical watch.

This can extend the duration of time that the speed of the mechanical watch 1 can be governed with the spiral spring 12 as illustrated in FIG. 14. Specifically, in the case where the speed governing control is performed with only the braking force of the balance 30, the speed governing cannot be controlled when the rewinding torque is reduced to T1, and therefore the speed of the balance 30 can be governed with the electronic speed governing apparatus 40 only up to 10.5 windings in the number of unwindings of the spiral spring 12, and, in the subsequent region where the torque of the spiral spring 12 is small, the accuracy becomes the accuracy of common mechanical watches because the electronic speed governing control of the balance 30 is stopped.

On the other hand, when the speed governing control is performed with the braking force and driving force of the balance 30 as in this embodiment, the speed governing can be controlled up to a rewinding torque T2 smaller than T1, and the speed governing control can be performed up to 13 windings in the number of unwindings of the spiral spring 12. In this manner, the mechanical watch 1 can extend the duration of time in which it can drive with the accuracy of quartz watches to 13 windings of the spiral spring 12.

Since the power switch 430 is composed of the bridge circuit composed of the four switches 431 to 434, the control circuit 53 can easily change the direction of the current flowing through the coil 35, selectively apply the braking force and driving force to the permanent magnet 36 through a simple control, and achieve the speed governing control of the advance and delay of the balance 30 in a simple circuit configuration.

Further, the control circuit 53 can easily control and switch the vibration detection state, speed governing state, and stop state by appropriately setting on and off the switches 431 to 434.

Since the permanent magnet 36 and the coil 35 serving as the speed governing unit are used also as the generator, it is not necessary to separately provide the generator. In this manner, compared with the case of using the generator provided separately from the speed governing unit, the number of components and in turn the cost can be reduced, and the mechanical watch 1 can be reduced in size and thickness.

Modifications

Note that the present disclosure is not limited to the embodiments, various modifications may be made within the scope of the present disclosure.

Figure 15:
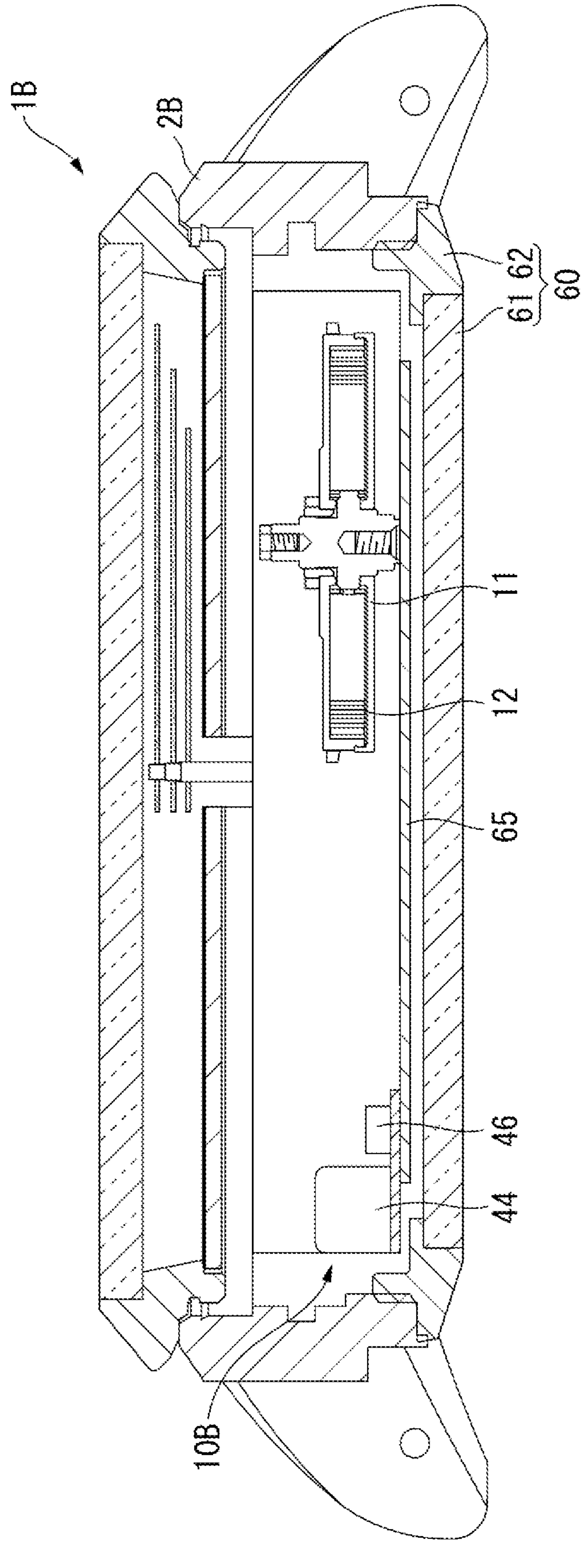
FIG. 15 is a schematic sectional view illustrating a mechanical watch of a modification.

For example, as in a mechanical watch 1B illustrated in FIG. 15, a solar panel 65 may be used as a generator. The mechanical watch 1B includes as a case back 60 of a case 2B, a glass case back 61, and a holding ring 62 that holds the outer periphery of the glass case back 61. Further, the solar panel 65 is attached to the case back 60 side of the mechanical movement 10B. The solar panel 65 generates power by receiving light transmitted through the glass case back 61.

In the mechanical movement 10B of the mechanical watch 1B, the barrel complete 11 including the spiral spring 12 inside, the storage unit 44 composed of a solid-state battery, the transducer 46 composed of a crystal oscillator are disposed as in the mechanical watch 1. Note that the train wheel 20, the escape wheel 21, the pallet 22, the balance 30 and the like are also provided in the mechanical movement 10B, but their illustration is omitted.

The mechanical watch 1B can provide the same operational effects as the embodiment. In addition, the solar panel 65 is an independent generator, and therefore can generate power without being affected by the torque variation of the spiral spring 12. Further, it is not necessary to use the permanent magnet 36 and the coil 35 provided in the balance 30 also as a generator, the permanent magnet 36 and the coil 35 suitable for the vibration detection and speed governing of the balance 30 can be used.

The solar panel 65 receives light from the glass case back 61, and as such generates smaller amount of power compared with common solar panels disposed on the dial side, but sufficient energy can be provided even with the small power generation amount because the mechanical watch 1B does not need to drive the hands driving motor, and only needs to drive the control unit 50 for the speed governing control. On top of that, a plastic dial that transmits light is used when the solar panel is disposed on the dial side, but when the solar panel 65 is provided on the case back 60 side, a metal dial that does not transmit light and the like can also be used and the external appearance of the watch is not limited, thus increasing the texture.

Figure 16:
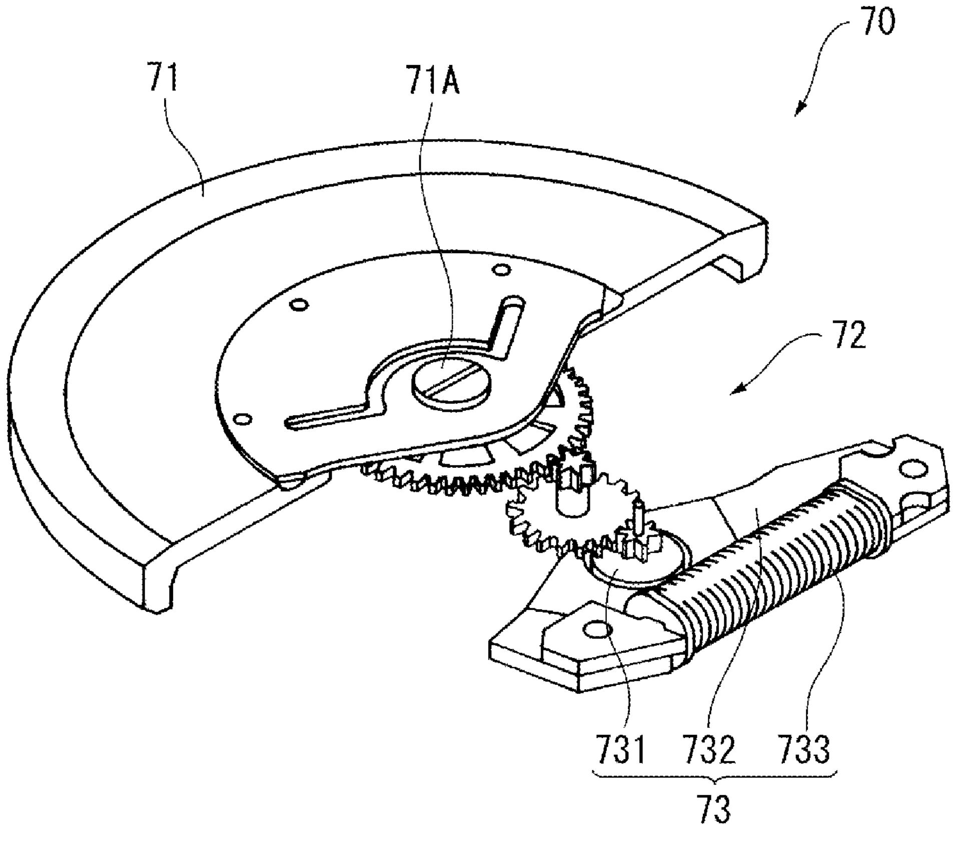
FIG. 16 is a perspective view illustrating an electromagnetic generator of another modification.

In addition, as illustrated in FIG. 16, an electromagnetic generator 70 that is not coupled with the spiral spring 12 may be used as a generator. The electromagnetic generator 70 includes a rotation weight 71, a power transmission mechanism 72, and a generator 73. The rotation weight 71 is configured to rotate around a rotation shaft 71A with an external kinetic energy. The power transmission mechanism 72 is a speed-increasing train wheel composed of a combination of a plurality of gears, and transmits the rotation of the rotation weight 71 to a rotor 731. As such, the rotation weight 71 and the power transmission mechanism 72 are a rotating mechanism for rotating the rotor 731.

The generator 73 includes the rotor 731, a stator 732 and a power generation coil 733, and generates power with the electromotive force of the rotation of the rotor 731 when the rotation of the rotation weight 71 is transmitted to the rotor 731 through the power transmission mechanism 72.

Even with the electromagnetic generator 70, the same operational effects as those of the above-described embodiments can be achieved, and the same effects as those of the mechanical watch 1B can be achieved because the electromagnetic generator 70 is an independent generator. In addition, as described above, the electromagnetic generator 70 requires only a small power generation amount because it does not drive the motor, and therefore the sizes of the rotation weight 71 and the generator 73 can be reduced than in common automatic winding quartz watches, and thus the mechanical watch can be reduced in size and thickness.

Note that the rotational movement of the rotation weight 71 may be used not only for power generation, but also for winding up the spiral spring 12. It is possible to adopt a combination based on a hand-winding mechanical watch in which the spiral spring 12 is manually performed and the power is generated with the rotation weight 71.

Figure 17:
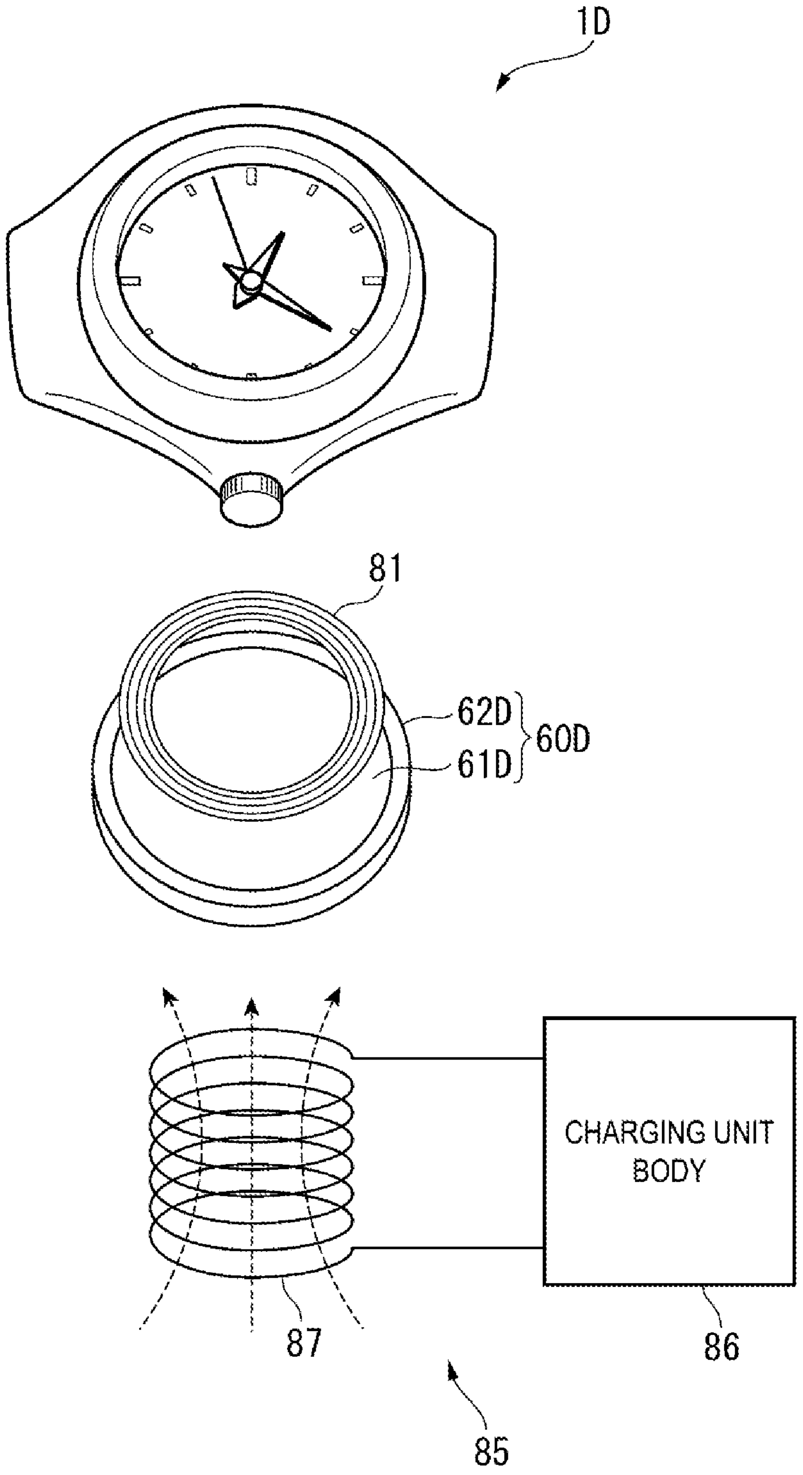
FIG. 17 is a schematic perspective view illustrating a generator of another modification.

As illustrated in FIG. 17, a wireless charging mechanism using the electromagnetic induction from an external charger 85 may be adopted as a generator provided in a mechanical watch 1D. The mechanical watch 1D includes a case back 60D including a glass case back 61D and a holding ring 62D, and a power reception coil 81 disposed on the case back 60D side of the movement. The reason for the use of the glass case back 61D is to efficiently transmit a charging radio frequency signal.

The external charger 85 includes a charging unit body 86 and a power transmission coil 87. When a power transmission signal of about 120 kHz is output from the charging unit body 86 to the power transmission coil 87, a current flows through the power transmission coil 87 and a magnetic field is generated. An induced current flows through the power reception coil 81 that has received the magnetic field, and thus the storage unit 44 can be charged. As such, the power reception coil 81 is a power generation coil that generates power through electromagnetic induction with the magnetic field applied from the outside.

Even with the external charger 85 and the power reception coil 81 described above, the same operational effects as those of the embodiments and the same effects as those of the mechanical watch 1B can be achieved because the external charger 85 and the power reception coil 81 are generators that do not use the mechanical energy of the spiral spring 12. In addition, since the dedicated power reception coil 81 is used as a coil that generates a current by receiving the magnetic field of the external charger 85, the transmission efficiency can be improved.

Note that the power generation coil 733 of the electromagnetic generator 70 can be used as the power reception coil. Specifically, even with the power generation coil 733, wireless charging can be performed by aligning the direction of the magnetic flux with the power transmission coil 87 of the external charger 85 in an appropriate positional relationship. In this case, the storage unit 44 can be charged through electromagnetic induction with the rotational movement of the rotation weight 71 while the user uses the mechanical watch worn on the wrist, and the storage unit 44 can be charged through wireless charging with the external charger 85 by placing the mechanical watch on the power transmission coil 87 of the external charger 85.

The balance 30 is not limited to the configuration including the two balance wheels 31 and 32, but may have a configuration including one balance wheel.

In addition, the coil 35 may be attached to the balance wheel, and the permanent magnet 36 may be fixed to the movement side. For example, the coil 35 may be attached to one balance wheel, and the permanent magnets 361 to 364 may be disposed and paired with the balance wheel therebetween.

The number of the permanent magnet 36 is not limited to four. Especially when a generator is separately provided and the coil 35 is not used for power generation but used for the speed governing and vibration detection of the balance 30, it suffices to provide at least one permanent magnet. In this case, the coil 35 is not limited to that disposed between the balance wheels 31 and 32, but may be disposed on the outer periphery side of the balance 30, and/or the dial side or the case back side of the balance 30.

In the embodiment, the coil 35 serves as both the vibration detection coil and the speed governing controlling coil, the vibration detection coil and the speed governing controlling coil may be separately provided.

Further, a plurality of speed governing controlling coils may be provided. For example, a vibration detection coil may be disposed at an intermediate position of the vibration of the balance wheels 31 and 32, and the speed governing controlling coils may be disposed on the left and right sides with that vibration detection coil therebetween.

The control circuit 53 outputs the delay pulse and advance pulse with the constant pulse width as the speed governing control signal, but the braking force and driving force may be adjusted by adjusting the pulse width of the delay pulse and advance pulse in accordance with the advance amount and delay amount of the vibration detection signal with respect to the clock signal.

In the embodiment, when the voltage of the storage unit 44 becomes equal to or smaller than the speed governing stop voltage, the speed governing control is switched to the stop state by turning off all switches 431 to 434 coupling the coil 35 with the first power-source line VDD and the second power-source line VSS, but the stop state may be set by disposing a high resistor between the coil 35 and the first power-source line VDD and the second power-source line VSS, for example. Specifically, it suffices that the stop state is a state where no electromagnetic force is generated at the coil 35 by supplying no current or only as little current as possible through the coil 35, or a state where no influence is exerted on the operation of the balance 30 by generating only a slight electromagnetic force that does not affect the speed governing control.

Overview of Present Disclosure

A mechanical watch of the present disclosure includes a spiral spring, a balance configured to be driven by power from the spiral spring, an oscillation circuit configured to output a clock signal, a vibration detection unit configured to detect a vibration of the balance and output a vibration detection signal, a speed governing unit including a permanent magnet and a coil, a speed governing control unit configured to control the speed governing unit to perform a speed governing control of the balance, a storage unit configured to store an electrical energy to be supplied to the speed governing control unit, and a generator configured to generate the electrical energy. One of the permanent magnet and the coil is held by the balance, the speed governing control unit compares the clock signal and the vibration detection signal and performs the speed governing control of the balance by exerting an electromagnetic force on the permanent magnet, the electromagnetic force being generated by outputting a current to the coil, and when a stored energy amount of the storage unit is equal to or smaller than a predetermined value, the speed governing control unit switches a state to a stop state where the speed governing control of the balance is stopped.

With the mechanical watch of the present disclosure, the speed of the vibration of the balance can be governed based on the comparison result of the clock signal and the vibration detection signal obtained by detecting the vibration of the balance, and thus the time accuracy of the mechanical watch can be improved to the level of the quartz watches. In addition, when the stored energy amount of the storage unit decreases to an amount equal to or smaller than the predetermined value, the state is switched to the stop state where the speed governing control is stopped, and thus the coil can be prevented from affecting the operation of the balance. In this manner, in the speed governing control stop state, the time accuracy indicated by hands can be maintained at the accuracy of common mechanical watches, and the time accuracy can be prevented from being significantly reduced.

Further, since the speed governing of the balance is performed by using the permanent magnet and the coil that generates an electromagnetic force with a current supplied thereto, the decelerating speed governing through application of the braking force, and the accelerating speed governing through application of the driving force to the balance can be performed. In particular, since the balance can be accelerated, the speed governing can be performed in the region where the torque of the spiral spring is small, i.e., the period in which the rewinding speed is low. This can extend the duration of time that the speed of the mechanical watch can be governed with the spiral spring.

The mechanical watch of the present disclosure may further include a power switch coupled between the coil and a power-source line configured to supply a current to the coil, and the speed governing control unit may switch the state to the stop state by turning the power switch off.

In the stop state, the speed governing control unit turns the power switch off, and thus the speed governing control unit can reliably decouple the coil from the power-source line and can prevent the coil from affecting the operation of the balance.

In the mechanical watch of the present disclosure the power-source line may include a first power-source line, and a second power-source line of a potential different from that of the first power-source line, the power switch may include a first switch coupled between a first terminal of the coil and the first power-source line, a second switch coupled between a second terminal of the coil and the first power-source line, a third switch coupled between the first terminal of the coil and the second power-source line, and a fourth switch coupled between the second terminal of the coil and the second power-source line, the speed governing control unit performs a control by switching between a speed governing state and the stop state, the speed governing state being a state where a speed of the balance is governed by controlling on and off of the first switch, the second switch, the third switch, and the fourth switch to control a direction of a current flowing through the coil, the stop state being a state where the first switch, the second switch, the third switch, and the fourth switch are controlled off and no current flows through the coil.

The power switch makes up the bridge circuit composed of four switches, and thus can change the direction of the current flowing through the coil through a simple control, selectively apply the braking force and driving force to the permanent magnet, and achieve the speed governing control of the advance and delay of the balance with a simple circuit configuration.

In the mechanical watch of the present disclosure, the vibration detection unit may include the coil, and a detection circuit coupled to the first terminal and the second terminal of the coil, and configured to detect a current flowing through the coil by the permanent magnet moving relative to the coil along with a vibration of the balance, the speed governing control unit may perform a control by switching among a vibration detection state, the speed governing state, and the stop state, the vibration detection state being a state where one of the first switch and the second switch is turned on, and the other of the first switch and the second switch, the third switch, and the fourth switch are turned off, the speed governing state being a state where one of the first switch and the second switch and one of the third switch and the fourth switch are turned on, and the other of the first switch and the second switch and the other of the third switch and the fourth switch are turned off, the stop state being a state where the first switch, the second switch, the third switch, and the fourth switch are turned off.

The speed governing control unit can easily switch and control the vibration detection state, speed governing state, and stop state by appropriately setting on and off of each switch.

In the mechanical watch of the present disclosure, the generator may be an electromagnetic generator including the permanent magnet and the coil and configured to generate power through a relative movement of the permanent magnet and the coil along with a vibration of the balance.

Since the permanent magnet and the coil serving as the speed governing unit is used also as the generator, it is not necessary to separately provide the generator. In this manner, compared with the case of using the generator provided separately from the speed governing unit, the number of components and in turn the cost can be reduced, the mechanical watch can be reduced in size and thickness.

In the mechanical watch of the present disclosure, the generator may be a solar generator including a solar panel.

By providing the solar panel as the generator, the power can be generated by the solar panel receiving light even in a non-carrying state when the mechanical watch is not used, and the speed governing of the balance control can be continued by preventing reduction in stored energy amount of the storage unit, thus maintaining the accuracy of the level of quartz watches.

In addition, since it is not necessary to generate power at the permanent magnet and the coil serving as the speed governing unit, it is not necessary to set the permanent magnet and the coil for power generation. In this manner, the number of permanent magnets can be reduced, and the coil can be downsized.

The mechanical watch of the present disclosure may further include a light-transmitting case back, and the solar panel may generate power by receiving light transmitted through the case back.

Since the solar panel receives light from the case back, the dial may not be composed of a light-transmitting plastic. This can reduce the limitation on the material and design of the dial and improve the design property.

In the mechanical watch of the present disclosure, the generator may be an electromagnetic generator including a power generation coil, a rotor, and a rotating mechanism configured to rotate the rotor.

Since the rotor is rotated with the rotating mechanism such as a rotation weight, power can be generated without using the mechanical energy of the spiral spring. In this manner, the power can be efficiently generated by rotating the rotation weight by carrying the mechanical watch. In addition, since the electromagnetic generator can be disposed inside the watch case, it is not necessary to provide a light-transmitting part unlike the case of using a solar panel, and there is no limitation on the external appearance of the watch, thus improving the design property.

In addition, by using the rotating mechanism also as the spiral spring winding mechanism, the power can be generated while automatically winding up the spiral spring, and it can be continuously driven with the accuracy of quartz watches by only carrying the mechanical watch.

In the mechanical watch of the present disclosure, the generator may include a power generation coil that generates power through electromagnetic induction with a magnetic field applied from outside.

Wireless charging can be achieved by placing the mechanical watch on an external dedicated charger. As such, it is necessary to place the mechanical watch on the dedicated charger, but the storage unit can be charged in a short time. In addition, since it is only necessary to provide the power generation coil in the mechanical watch, the mechanical watch can be reduced in size and thickness compared with the case where the solar panel and/or the electromagnetic generator is provided inside.

What is claimed is:

1. A mechanical watch comprising:
- a spiral spring;
- a balance configured to be driven by power from the spiral spring;
- an oscillation circuit configured to output a clock signal;
- a vibration cycle detection unit configured to detect a vibration cycle of the balance and output a vibration cycle detection signal;
- a speed governing unit including a permanent magnet and a coil;
- a speed governing control unit configured to control the speed governing unit to perform a speed governing control of the balance;
- a storage unit configured to store an electrical energy to be supplied to the speed governing control unit;
- a generator configured to generate the electrical energy; and
- a power switch coupled between the coil and a power-source line configured to supply current to the coil, wherein
- one of the permanent magnet and the coil is held by the balance,
- the speed governing control unit compares the clock signal and the vibration cycle detection signal and performs the speed governing control of the balance by exerting an electromagnetic force on the permanent magnet, the electromagnetic force being generated by outputting current to the coil, and
- when a stored energy amount of the storage unit is equal to or smaller than a predetermined value, the speed governing control unit changes states to a stop state where the speed governing control of the balance is stopped, and
- the speed governing control unit changes the states to the stop state by turning the power switch off.

2. The mechanical watch according to claim 1, wherein
- the power-source line includes a first power-source line and a second power-source line of a potential different from that of the first power-source line,
- the power switch includes:
  - a first switch coupled between a first terminal of the coil and the first power-source line;
  - a second switch coupled between a second terminal of the coil and the first power-source line;
  - a third switch coupled between the first terminal of the coil and the second power-source line; and
  - a fourth switch coupled between the second terminal of the coil and the second power-source line,
- the speed governing control unit performs a control by switching between a speed governing state and the stop state,
- the speed governing state being a state where a speed of the balance is governed by controlling on and off of the first switch, the second switch, the third switch, and the fourth switch to control a direction of the current flowing through the coil, and
- the stop state being a state where the first switch, the second switch, the third switch, and the fourth switch are controlled off and no current flows through the coil.

3. The mechanical watch according to claim 2, wherein
- the vibration cycle detection unit includes:
  - the coil; and
  - a detection circuit coupled to the first terminal and the second terminal of the coil, and configured to detect the current flowing through the coil by the permanent magnet moving relative to the coil due to the vibration cycle of the balance,
- the speed governing control unit performs the control by switching among a vibration cycle detection state, the speed governing state, and the stop state,
- the vibration cycle detection state is a state where one of the first switch and the second switch is turned on, and the other of the first switch and the second switch, the third switch, and the fourth switch are turned off,
- the speed governing state is a state where one of the first switch and the second switch and one of the third switch and the fourth switch are turned on, and the other of the first switch and the second switch and the other of the third switch and the fourth switch are turned off, and
- the stop state is a state where the first switch, the second switch, the third switch, and the fourth switch are turned off.

4. The mechanical watch according to claim 1, wherein
- the generator is an electromagnetic generator including the permanent magnet and the coil, and configured to generate power through a relative movement of the permanent magnet and the coil due to the vibration cycle of the balance.

5. The mechanical watch according to claim 1, wherein
- the generator is a solar generator including a solar panel.

6. The mechanical watch according to claim 5, further comprising
- a light-transmitting case back, wherein
- the solar panel generates power by receiving light transmitted through the light-transmitting case back.

7. The mechanical watch according to claim 1, wherein
- the generator is an electromagnetic generator including a power generation coil, a rotor, and a rotating mechanism configured to rotate the rotor.

8. The mechanical watch according to claim 1, wherein the generator includes a power generation coil configured to generate power through electromagnetic induction with a magnetic field applied from outside.

9. A mechanical watch comprising:

a spiral spring;

a balance configured to be driven by power from the spiral spring;

an oscillation circuit configured to output a clock signal;

a vibration cycle detection unit configured to detect a vibration cycle of the balance and output a vibration cycle detection signal;

a speed governing unit including a permanent magnet and a coil;

a speed governing control unit configured to control the speed governing unit to perform a speed governing control of the balance;

a storage unit configured to store an electrical energy to be supplied to the speed governing control unit;

a generator configured to generate the electrical energy; and a light-transmitting case back, wherein one of the permanent magnet and the coil is held by the balance, the speed governing control unit compares the clock signal and the vibration cycle detection signal and performs the speed governing control of the balance by exerting an electromagnetic force on the permanent magnet, the electromagnetic force being generated by outputting current to the coil, when a stored energy amount of the storage unit is equal to or smaller than a predetermined value, the speed governing control unit changes states to a stop state where the speed governing control of the balance is stopped, the generator is a solar generator including a solar panel, and the solar panel generates power by receiving light transmitted through the light-transmitting case back.

* * * * *